(12) United States Patent
Paftali et al.

(10) Patent No.: US 10,053,041 B2
(45) Date of Patent: Aug. 21, 2018

(54) MECHANISM FOR CHANGING THE LUGGAGE COMPARTMENT WIDTH IN A VEHICLE

(71) Applicant: Pressan Madeni Esya Sanayi Ve Ticaret Anonim Sirketi, Kirac Esenyurt Istanbul (TR)

(72) Inventors: Ozan Paftali, Istanbul (TR); Feza Gokisik, Istanbul (TR)

(73) Assignee: PRESSAN MADENI ESYA SANAYI VE TICARET ANONIM SIRKE, Istanbul (TR)

( * ) Notice: Subject to any disclaimer, the term of this patent is extended or adjusted under 35 U.S.C. 154(b) by 0 days.

(21) Appl. No.: 15/542,085

(22) PCT Filed: Jan. 9, 2015

(86) PCT No.: PCT/TR2015/000024
§ 371 (c)(1),
(2) Date: Jul. 7, 2017

(87) PCT Pub. No.: WO2016/111653
PCT Pub. Date: Jul. 14, 2016

(65) Prior Publication Data
US 2018/0111577 A1    Apr. 26, 2018

(51) Int. Cl.
*B60R 21/02* (2006.01)
*B60R 5/04* (2006.01)

(52) U.S. Cl.
CPC .............. *B60R 21/026* (2013.01); *B60R 5/04* (2013.01)

(58) Field of Classification Search
CPC ................................ B60R 21/026; B60R 5/04
(Continued)

(56) References Cited

U.S. PATENT DOCUMENTS 4,621,856 A * 11/1986 McKenzie ............ B60R 21/026
                                                              280/749
4,919,467 A *  4/1990 Guimelli ............... B60R 21/026
                                                              296/24.43
(Continued)

FOREIGN PATENT DOCUMENTS

AU    2006249287    6/2007
DE      29509653   10/1995
(Continued)

OTHER PUBLICATIONS

International Search Report for PCT/TR2015/000024 dated Sep. 8, 2015.
Written Opinion for PCT/TR2015/000024 dated Sep. 8, 2015.

*Primary Examiner* — Jason S Morrow
(74) *Attorney, Agent, or Firm* — Oppedahl Patent Law Firm LLC

(57) ABSTRACT

The invention relates to a luggage compartment separator (1) that changes the luggage compartment width in the vehicles with the component parts of two telescopic roof rails (2) that are positioned parallel to one another; four roof brackets (3) that enable said roof rails (2) to be mounted to the roof of the vehicle and are arranged at a quantity of two per roof rail (2); the top mat (4) that is positioned to separate the top-seat compartment of the vehicle and hangs down from said roof rail (2); the bottom mat (5) that is positioned adjacent to said top mat (4); at least one lock mechanism 1 (6) on said top mat (4) for enabling the top mat (4) to be secured to the side surface of the vehicle; the lock mechanism 2 (7) on the bottom mat (5) for connecting the bottom mat (5) and the top mat (4) with each other in both open and closed positions and for enabling the same to remain stationary; and the fixing mechanism (8) that enables the bottom mat (5) to be secured to the vehicle floor when in open position.

2 Claims, 3 Drawing Sheets

Figure 1:
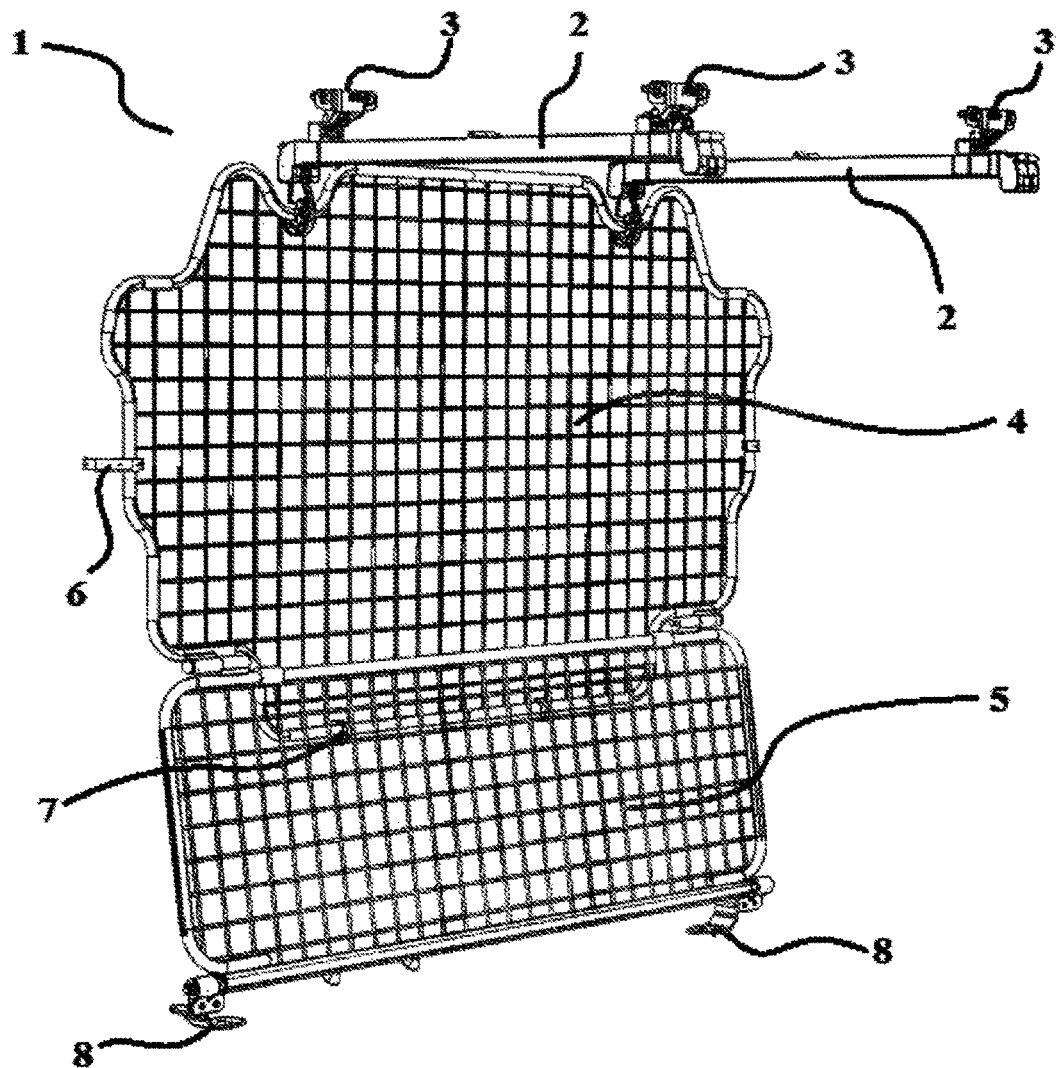

(58) Field of Classification Search
USPC .................................... 296/24.43; 160/377
See application file for complete search history.

(56) References Cited

U.S. PATENT DOCUMENTS

| | | | | |
|---|---|---|---|---|
| 5,167,479 | A * | 12/1992 | Bott ................. | B01D 53/485 |
| | | | | 224/42.33 |
| 5,735,564 | A * | 4/1998 | Coogan ............. | B60R 21/026 |
| | | | | 280/748 |
| 6,059,313 | A * | 5/2000 | Coogan ............. | B60R 21/026 |
| | | | | 280/749 |
| 7,731,255 | B2 * | 6/2010 | McJunkin .......... | B60P 7/14 |
| | | | | 296/24.4 |
| 9,586,551 | B2 * | 3/2017 | Richter ............. | B60R 21/026 |
| 2006/0108815 | A1 * | 5/2006 | Giumelli ........... | B60R 21/026 |
| | | | | 296/24.4 |

FOREIGN PATENT DOCUMENTS

| | | | | |
|---|---|---|---|---|
| FR | 3010018 A1 * | 3/2015 | ........... | B60R 21/026 |
| GB | 2384464 | 7/2003 | | |
| TR | 2009/01952 | 3/2009 | | |

* cited by examiner

MECHANISM FOR CHANGING THE LUGGAGE COMPARTMENT WIDTH IN A VEHICLE

TECHNICAL FIELD

The invention relates to a mechanism for changing the luggage compartment width in the vehicles, which is able to be applied to any kind of vehicle by various modifications and which is suitable for use particularly in the commercial vehicles.

STATE OF THE ART

According to the state of the art, the luggage compartment separators are used in the vehicles for the purpose of transporting especially the loads and domestic animals.

These separators are used as incorporated to the luggage compartment or in roll-away net types.

According to the state of the art, the separators in the form of a net are mounted to a certain point of the vehicles and are stretched from their mounting point to separate the luggage and passenger compartments from one another.

However, even though the separators in the form of a net according to the state of the art provide ease of use and assembly, they are poor in terms of strength and they have a configuration that could be easily damaged by the animals in case they are used for transporting the pets.

According to the state of the art, the separators manufactured from the metallic materials for use in transporting the loads are generally fixed to the vehicle and it is not possible to increase their width. In other words, it is not possible to use the vehicle volume according to the number of passengers or loads on the vehicle.

For example, in case there is an excessive amount of load to be transported according to the state of the art, it is not possible to fold the back seats to extend the luggage compartment separating mechanism up to the front seats. Moreover, in case of a great number of passengers, it is not possible to retract the luggage compartment separator to be aligned with the luggage compartment in a way to allow the use of the back seats.

According to the state of the art, there are some improvements aimed at separating the luggage compartment.

An example of the improvements realized according to the state of the art is the patent/utility model application/document with the application no. TR2009/01952, entitled "A luggage compartment separating mechanism". The application includes the following: "The present invention relates to a luggage compartment separating mechanism (1), which prevents the loads in the luggage compartment of the vehicles from being scattered and from being damaged during the motion. By means of the luggage compartment separating mechanism (1) according to the invention, the objects in the luggage compartments of the vehicles are prevented from being scattered. It is also enabled to store the component parts of the luggage separating mechanism (1) without occupying space in the usable volume inside the vehicle and easily access the spare tire compartment while the mechanism (1) is present within the luggage compartment."

As a result, the drawbacks described above and the inadequacy of the existing solutions have led to the necessity to develop a mechanism for changing the luggage compartment width in the vehicles, which is able to be applied to any kind of vehicle by various modifications and which is suitable for use particularly in the commercial vehicles.

BRIEF DESCRIPTION OF THE INVENTION

The present invention relates to a mechanism for changing the luggage compartment width in the vehicles, which meets the above-mentioned requirements, eliminates the disadvantages and provides some additional advantages.

The principal object of the invention is to provide the possibility to change the width of the luggage compartments of the vehicles according to the situations and conditions.

Another object of the invention is to prevent the loads and similar objects being transported in the vehicles from falling on and damaging the passengers during the travel.

Another object of the invention is to provide 2 different positions in the vehicle, namely the front position and the back position.

In the front position, a greater luggage compartment volume is provided in the vehicle. The front position allows only two passengers (including the driver) to travel at the same time in the vehicle. For this position, the end users may use only the first row seats of the vehicle during the travel. The other seats should either be folded up or removed from the vehicle.

In the back position, there is a smaller luggage space available. Thus, more than 2 passengers can travel in the vehicle.

An object of the invention is to provide lockable mechanisms in addition to the opening-closing mechanisms. Owing to the mechanisms that allow said locking action, a safe load and passenger transportation is provided.

The structural and characteristic features and all the advantages of the invention will be more clearly understood from the enclosed figures and from the detailed description written with reference to said figures, and therefore, the evaluation should made taking said figures and detailed description into consideration.

FIGURES TO AID IN UNDERSTANDING THE INVENTION

"Mechanism for changing the luggage compartment width in the vehicles", which is the subject matter of our application, is illustrated in the enclosed figures where:

FIG. 1: A view of the luggage compartment separator (1) of "the mechanism for changing the luggage compartment width in the vehicles" according to the invention.

Figure 2:
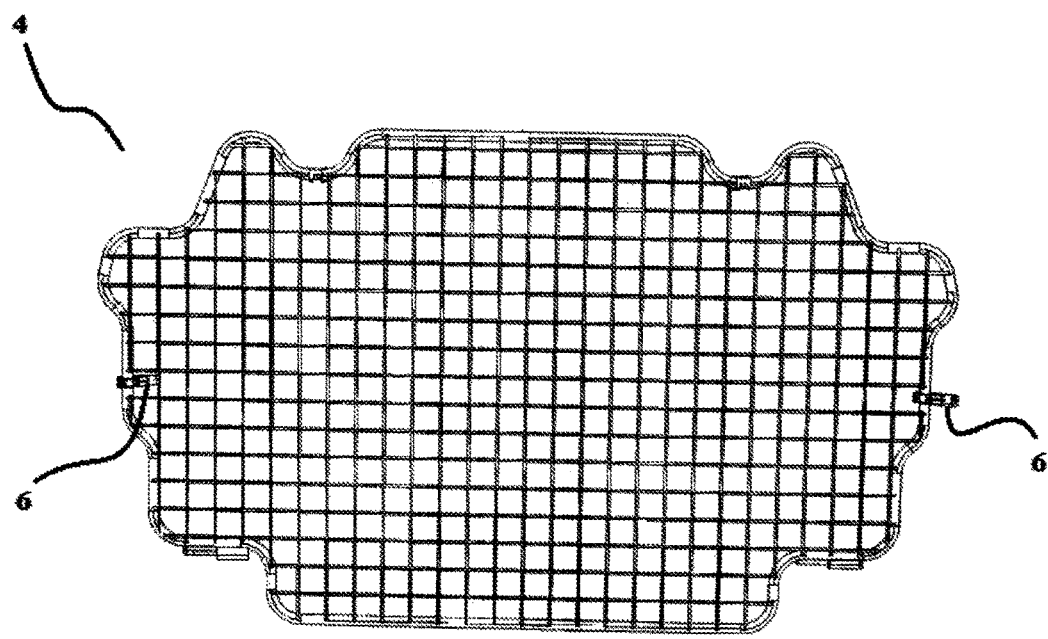

FIG. 2: A view of the top mat (4) of "the mechanism for changing the luggage compartment width in the vehicles" according to the invention.

Figure 3:
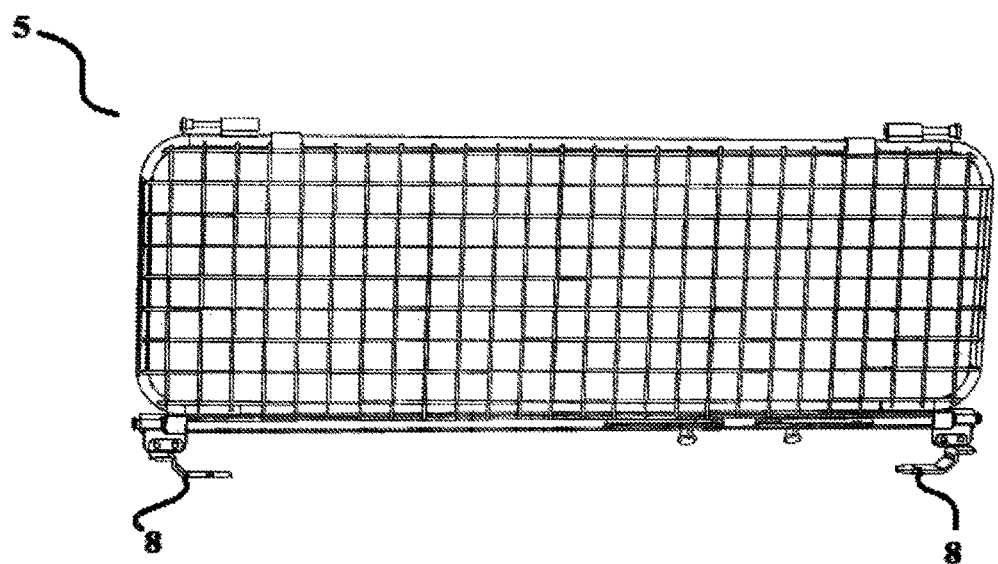

FIG. 3: A view of the bottom mat (5) of "the mechanism for changing the luggage compartment width in the vehicles" according to the invention.

Figure 4:
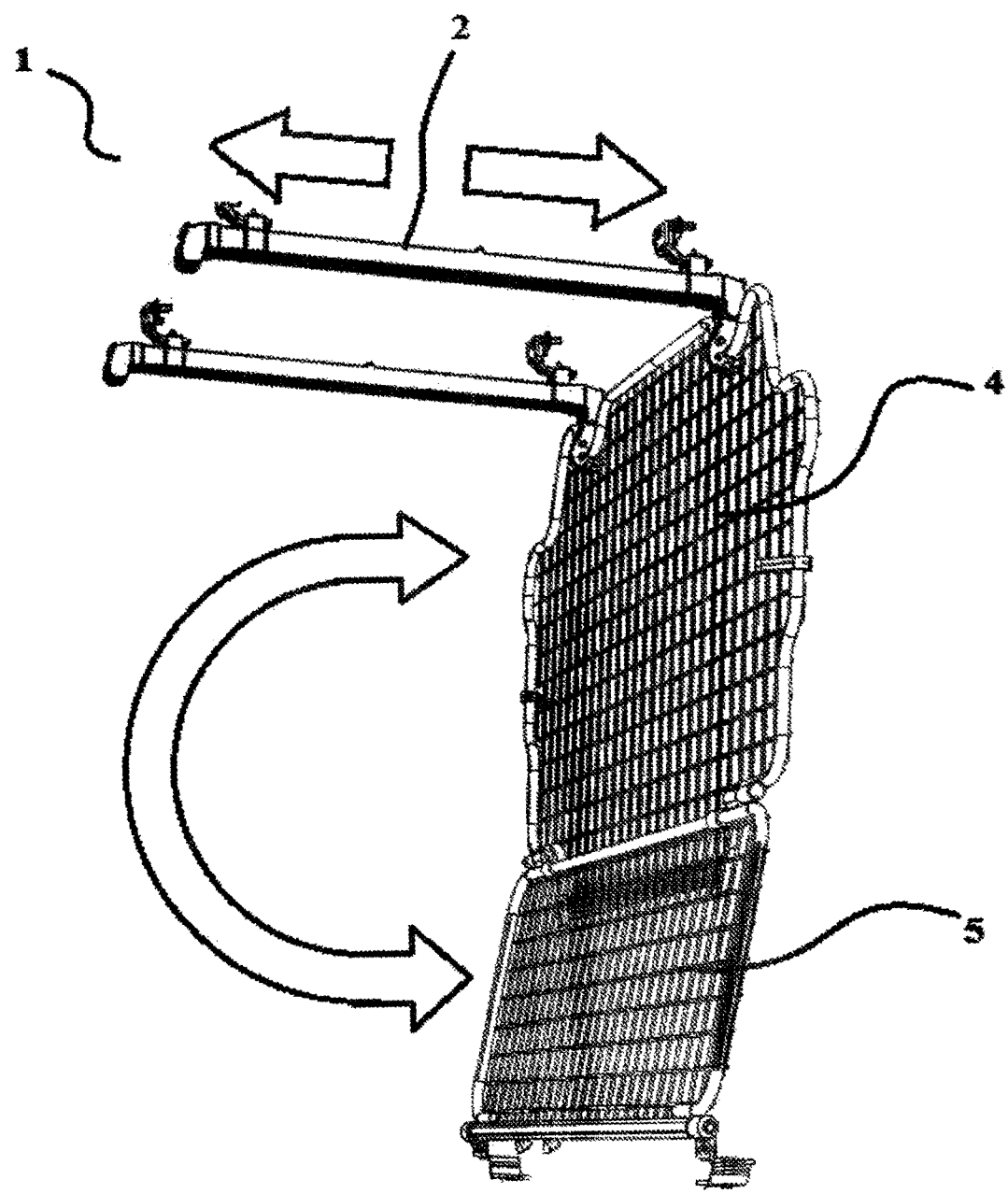

FIG. 4: A view showing the manner in which the luggage compartment separator (1) of "the mechanism for changing the luggage compartment width in the vehicles" according to the invention is opened and closed.

"The figures in the drawing are generally representative and they are not necessarily drawn to scale. Some details might have been omitted, which are not essential for understanding the invention. Moreover, the components that are at least substantially identical or that have at least substantially identical functions are shown with the same reference number."

DESCRIPTION OF THE REFERENCE NUMBERS

Our invention entitled "a mechanism for changing the luggage compartment width in the vehicles", which is the subject matter of our present application, is assigned with reference numbers in the enclosed drawings, with the designations corresponding to said reference numbers being provided below.

| NO. | PART NAME |
| --- | --- |
| 1. | Luggage compartment separator |
| 2. | Roof rail |
| 3. | Roof bracket |
| 4. | Top mat |
| 5. | Bottom mat |
| 6. | Lock mechanism 1 |
| 7. | Lock mechanism 2 |
| 8. | Fixing mechanism |

DETAILED DESCRIPTION OF THE INVENTION

In this detailed description, the preferred embodiments of the mechanism for changing the luggage compartment width in the vehicles according to the invention are described only in order to enable a better understanding of the subject matter in a way not leading to any limiting effect.

Further, some components might be used in different ways in the sentences in order to maintain the content integrity and enable a better understanding of the invention. Thus, such components used in various expressions actually represent the respective component assigned with the same reference numeral.

The invention comprises the component parts of a luggage compartment separator (1) that changes the luggage compartment width in the vehicles; two telescopic roof rails (2) that are positioned parallel to one another; four roof brackets (3) that enable said roof rails (2) to be mounted to the roof of the vehicle and are arranged at a quantity of two per roof rail (2); the top mat (4) that is positioned to separate the top-seat compartment of the vehicle and hangs down from said roof rail (2); the bottom mat (5) that is positioned adjacent to said top mat (4); at least one lock mechanism 1 (6) on said top mat (4) for enabling the top mat (4) to be secured to the side surface of the vehicle; the lock mechanism 2 (7) on the bottom mat (5) for connecting the bottom mat (5) and the top mat (4) with each other in both open and closed positions and for enabling the same to remain stationary; and the fixing mechanism (8) that enables the bottom mat (5) to be secured to the vehicle floor when in open position.

The Mode of Assembly for the Luggage Compartment Separator (1) According to the Invention:

The luggage compartment separator according to the invention has 2 different positions, namely the front position and the back position. For the front position, the roof rail (2) is required to advance in the forward direction. For the back position, the roof rail is required to move in the backward direction.

The front position provides a greater luggage compartment volume in the vehicle and allows only two passengers (including the driver) to travel at the same time in the vehicle. For this position, the end users may use only the first row seats of the vehicle during the travel. The other seats should either be folded up or removed from the vehicle.

In the back position, there is a smaller luggage space available. Thus, more than 2 passengers can travel in the vehicle.

In order to bring the luggage compartment separator (1) from the back position to the front position:
- The lock mechanism 1 (6), lock mechanism 2 (7) and lock mechanism (3) should be brought into the free position.
- The bottom mat (5) should be folded towards the top mat (4).
- The lock mechanism 2 (7) should be connected to the top mat (4).
- The user should first lift and then push the top mat (4) and the bottom mat (5) to enable the same to move from the back position towards the front position by means of the roof rail (2).
- The lock mechanism 2 (7) should be opened to enable the bottom mat (5) to be separated from the top mat (4).
- The lock mechanism 1 (6), lock mechanism 2 (7) and lock mechanism (3) should be brought to "locked position" from the "free position".

Assembly of the Roof Brackets (3):

There are 2 assembly steps for the roof brackets (3), namely the right roof brackets (3) and the left roof brackets (3). The system requires the assembly of a total of 4 roof brackets (3), 2 on the right and 2 on the left.

In order to mount 1 roof bracket (3) to the vehicle, 2 metric 6 bolts are needed. Moreover, another bolt is used for connecting the roof bracket (3) assembly to the roof rail (2) assembly. Different centering components are available for the assembly of the right and left roof brackets (3). These enable an easier assembly on the vehicle and prevent the incorrect assembly.

The primary aim of the assembly of the roof bracket (3) is to connect the roof rails (2) and the vehicle with each other. The assembly of the roof bracket (3) is not dependent on whether the vehicle is a short or long vehicle.

Assembly of the Roof Rails (2):

There are two different assemblies of roof rails (2), for long vehicles and short vehicles. The entire system requires the assembly of 2 roof rails (2) of the same length (according to the length of the vehicle) per vehicle.

"The roof rails (2)" may be connected to the vehicle via "the roof brackets (3)". There are 2 brackets with welded nuts on the end portions of the rails. 1 metric 6 bolt connects one roof rail (2) with the roof bracket (3). Overall, the system requires 2 bolts per roof rail (2).

Each roof rail (2) includes, for its assembly, 1 carrier slide hook and carrier slide hook cover. The assembly of the carrier slide hook enables a smooth motion owing to 2 disc-shaped plastic reels and the lubricant applied on the inner surface of the roof rail (2).

The roof brackets (3) at the ends of the roof rails (2) are connected to the body of the roof rail (2) by way of welding.

The invention claimed is:

1. A luggage compartment separator (1) that changes a luggage compartment volume in vehicles, characterized in that it comprises:
    two telescopic roof rails (2) that are positioned parallel to one another;
    four roof brackets (3) that enable said roof rails (2) to be mounted to a roof of the vehicle and are arranged at a quantity of two per roof rail (2);
    a top mat (4) that is positioned to separate a top-seat compartment of the vehicle and hangs down from said roof rails (2);

a bottom mat (5) that is positioned adjacent to said top mat (4);

at least one lock mechanism 1 (6) on said top mat (4) for enabling the top mat (4) to be secured to a side surface of the vehicle;

a lock mechanism 2 (7) on the bottom mat (5) for connecting the bottom mat (5) and the top mat (4) with each other in both open and closed positions and for enabling the same to remain stationary; and a fixing mechanism (8) that enables the bottom mat (5) to be secured to a vehicle floor when in open position.

2. The luggage compartment separator of claim 1, further characterized in that it is used in a commercial vehicle.

* * * * *